United States Patent [19]

Fey

[11] 3,997,333
[45] Dec. 14, 1976

[54] PROCESS FOR THE REDUCTION OF COMPLEX METALLIC ORES

[75] Inventor: Maurice G. Fey, Pittsburgh, Pa.

[73] Assignee: Westinghouse Electric Corporation, Pittsburgh, Pa.

[22] Filed: Feb. 26, 1975

[21] Appl. No.: 553,404

[52] U.S. Cl. .................... 75/11; 75/21; 75/26; 75/38; 75/84; 75/130.5

[51] Int. Cl.² .......................... C21C 5/52

[58] Field of Search ............ 75/11, 12, 10, 21, 38, 75/26, 130.5, 84

[56] References Cited

UNITED STATES PATENTS

| | | | |
|---|---|---|---|
| 2,123,240 | 7/1938 | Hammarberg | 75/21 |
| 3,140,168 | 7/1964 | Halley et al. | 75/40 X |
| 3,765,870 | 10/1973 | Fey et al. | 75/11 |
| 3,862,834 | 1/1975 | von Wadawiczek et al. | 75/11 |

Primary Examiner—M. J. Andrews
Attorney, Agent, or Firm—L. P. Johns

[57] ABSTRACT

A process for the beneficiation and reduction of complex metallic ores characterized by the step of first preheating a complex ore containing a plurality of metal oxides in a reducing gas atmosphere at a temperature sufficient to reduce at least one oxide of a metal having a lower affinity for oxygen than at least another metal oxide present, separating the reduced metal from the oxides of the unreduced metal, and treating the remaining unreduced metal oxides in an arc heater in a reducing gas atmosphere to reduce said other metal oxides to elemental form.

8 Claims, 2 Drawing Figures

PROCESS FOR THE REDUCTION OF COMPLEX METALLIC ORES

CROSS-REFERENCE TO RELATED APPLICATION

This invention is related to the copending application of Maurice G. Fey and Edna A. Dancy, entitled "Process for Production of Metal or an Alloy," No. 553,401, filed Feb. 26, 1975

BACKGROUND OF THE INVENTION

1. Field of the Invention

This invention relates to a process for sequentially reducing metals from an ore containing a plurality of metal oxides. More particularly, it pertains to a process for employing an electric arc heater for the reduction of metal oxides.

2. Description of the Prior Art

As disclosed in U.S. Pat. No. 3,232,746 entitled "Methods for Reduction of Metal Oxide" by B. Karlovitz, electric furnaces or arc heaters have been used to assist in the reduction of metal oxides, usually in combination with a gas, such as oxygen, carbon monoxide, hydrogen, or certain hydrocarbon gases. An outgrowth of that process has been a method of using a preheater or prereducing step by which a metal oxide, such as ferrous oxide ($Fe_2O_3$), is reduced to a less stable oxide, such as ferric oxide (FeO), before being introduced into the electric arc heater, thereby deriving an economic advantage such as a savings of fuel and/or a higher quality end product.

SUMMARY OF THE INVENTION

It has been found in accordance with this invention that metals may be sequentially reduced from complex ores, such as spinels, by a series of reducing steps, comprising the steps of prereducing an ore in a gas reducing atmosphere, such as in a fluidized bed, at a temperature sufficient to reduce at least one oxide of a metal having a lower affinity for oxygen than at least another metal present, separating the metal of the reduced oxide from the remaining or unreduced oxide, and treating the remaining oxide in an arc heater in a reducing gas atmosphere to reduce said other metal oxide to elemental form.

The advantage of the process of this invention is that certain low grade ores may be upgraded, or two or more metals may be sequentially reduced from their oxide states to the elemental form or oxide form of lower order than the original oxide form.

DESCRIPTION OF THE PREFERRED EMBODIMENTS

Figure 1:
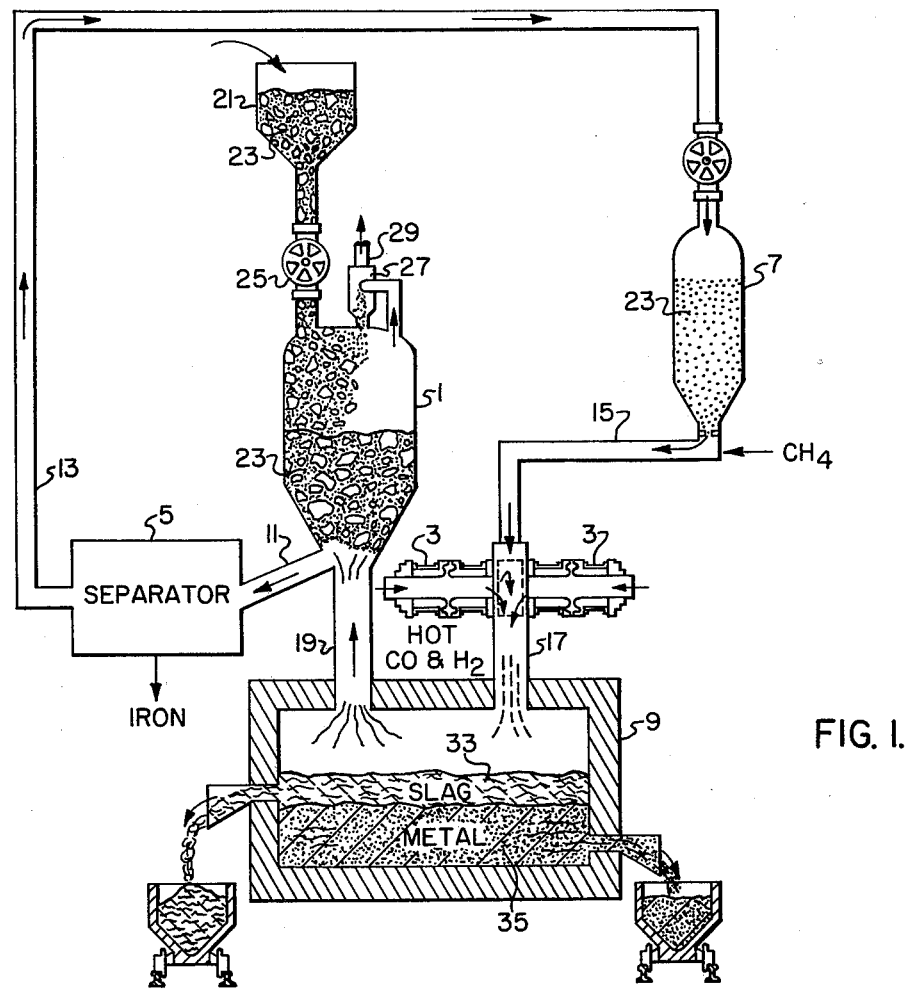
FIG. 1 is a diagrammatic view showing a two-step beneficiation process for the direct reduction of metallic ore to the state of a pure metal, or alloy.
Figure 2:
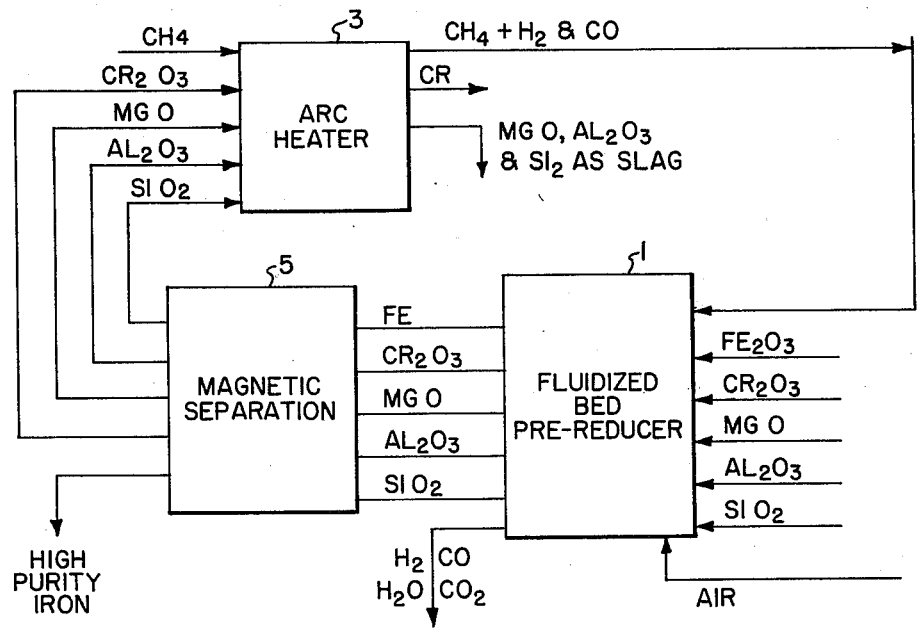
FIG. 2 is a diagrammatic view of an example for the sequential reduction of metals from a complex ore.

The process of this invention employs a sequence of steps for reducing metal from a complex ore or an oxide which sequence is dependent upon the order of affinity of each metal involved for its oxide form, the metal having the lowest affinity for oxygen being the first to be reduced which is followed thereafter in the next step by the metal having the next lowest affinity for oxygen, etc. The first step of preheating and prereducing the ore is carried out in a gas-solid reactor such as a fluidized bed, packed bed (blast furnace), spouted bed, rotary kiln, multiple hearth furnace, and the like. For purposes of illustration, the fluidized bed is preferred. Thereafter any elemental metal or magnetic oxide formed is separated by suitable means such as by a flotation method, leaching, or a magnetic separator, as in the case of prereduced iron. Thereafter the prereduced and preferably preheated ore is additionally reduced by introducing it into an arc heater in a reducing gas atmosphere to reduce at least one other metal having a higher affinity for oxygen to the elemental form, the reducing gas atmosphere comprising a carbon source such as methane, pulverized coal or coke, oil, natural gas, or other hydrocarbons. The excess of methane as well as reducing gases, carbon monoxide, and hydrogen produced in the arc heater are returned to the prereducer where they serve the dual purpose of preheating the raw material and prereducing the oxide of the metal having the lowest affinity for oxygen. In needed, additional heating in the prereducer can be accomplished by the introduction of small amounts of air which react with the hydrogen and carbon monoxide.

The process of this invention may be used for the reduction of ore of a metal comprising at least one oxide of a metal, and is preferably used for the reduction of metals in Group Numbers 5$b$, 6$b$, 7$b$, and 8 of the Periodic Table. Those metals include titanium, vanadium, chromium, manganese, iron, cobalt, nickel, niobium, tantalum, molybdenum, and tungsten which usually exist in the combination with oxides of other elements.

The process of this invention for the beneficiation and reduction of complex metallic ores is suitable for the reduction of the oxides of various metals which are found in a combined state in nature. The process is particularly suitable for the reduction of complex metallic ores containing oxides of iron and chromium. The process of this invention is particularly adaptable to the beneficiation reduction of complex metallic ores containing iron and chromium oxides together with oxides of other metals normally associated with the ores, such as oxides of magnesium, aluminum, and silicon.

The apparatus, by which the process of this invention is preferably performed, includes a prereducer 1 (FIG. 1) and an arc heater 3. The apparatus of this invention may also include other devices comprising a separator 5, a feed injector 7, a metal holding furnace 9, and interconnecting conduits 11, 13, 15, 17, and 19.

The prereducer 1 is a gas-solid reactor which is usually operated at an elevated temperature, such as a packed bed (blast furnace), spouted bed, rotary kiln, multiple hearth furnace, or a fluidized bed. The prereducer 1 is preferably a fluidized bed having a hopper 21 by which ground or pulverized ore 23 is introduced into the fluidized bed or prereducer 1 through a rotary lock hopper 25. Expended gas leaves the prereducer 1 through a cyclone separator 27 and then through an off-gas vent 29.

The first metal to be reduced is iron and is separated from the prereduced ore by a separator 5. Inasmuch as elemental iron and certain of its oxides are magnetic, the separator 5 is preferably a magnetic separator. However, where the prereduced element is a metal other than iron, the separator 5 may be subjected to another separation method, such as flotation or leaching.

The prereduction of iron-bearing constituents in chromite ore is achieved in the fluidized bed 1 without the reduction of the chromium constituents. This is due to the greater stability of the chromium oxide ($Cr_2O_3$) compared with ferrous oxide ($Fe_2O_3$). It can also be shown from thermochemical considerations that iron oxide can be completely reduced by controlling the gas consumption in the fluidized bed 1. The formula for the reaction which occurs in the fluidized bed 1, is substantially as follows: ps

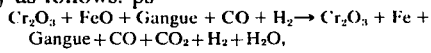

where Gangue consists of MgO, $Al_2O_3$ and $SiO_2$.

It is noted that widely varying raw material compositions are possible and that thermodynamic equilibrium predicts the stoichiometric gas proportions.

The temperature of the reaction in the fluidized bed is generally conducted at a temperature range of from 800° F to 1700° F and at a preferred temperature of 1350° F. As noted in the drawing, reducing gases comprising methane, hydrogen, and carbon monoxide in excess quantities flow from the arc heater 3 into the prereducer or fluidized bed 1 together with an amount of air sufficient to react with the other gases to increase the temperature to the necessary point where the reaction is sufficient to reduce ferrous oxide to elemental iron or to a magnetic oxide without affecting the chromium oxide. The intermediate product issuing from the fluidized bed 1 includes elemental iron, chromium oxide ($Cr_2O_3$), magnesium oxide (MgO), aluminum oxide ($Al_2O_3$), silica ($SiO_2$), and an excess of gases including hydrogen, carbon monoxide, water vapor, and carbon monoxide, water vapor, and carbon dioxide.

In most cases, it is preferred that the elemental iron, or a resulting magnetic oxide, be eliminated from the intermediate product for which reasons the product is put through a magnetic separator 5, whereby the iron is eliminated and the remaining oxides of chromium, magnesium, aluminum, and silica continue to the arc heater 3 as shown in the drawing.

The arc heater 3, being the second step of overall process of this invention, is the stage where the final reduction of ore or oxide occurs. The arc heater 3 similar in construction and operation to that disclosed in U.S. Pat. No. 3,765,870, entitled "Method of Direct Ore Reduction Using a Short Gap Arc Heater" of which the inventors are Maurice G. Fey and George A. Kemeny. Because of the full disclosure in that patent the description of the arc heater 3 is limited herein to the basic structure and operation. The arc heater 3 (FIG. 1) is a single-phase, self-stabilizing A.C. device capable of power levels up to about 3500 kilowatts for up to 10,000 kilowatts for a three phase plant installation. For the practice of this invention it is preferred that three arc heaters 3 be provided, one for each of the three phases of the A.C. power supply. Two arc heaters 3 are shown in FIG. 1.

A carbon-bearing reductant, such as methane, natural gas, oil, pulverised coal, coke, or other hydrocarbons, is preferably injected at 31 to carry the preheated and prereduced ore 23 from the injector 7 through the conduit 15 and into the manifold-conduit 17 where the ore 23 enters the second stage of the process, and in which the ore is reduced from any oxide form to the pure metal such as iron. The temperature range for the second step of the reduction is from about 3000° F to 5000° F. The gaseous atmosphere in which the second step of the reduction occurs comprises hot reducing gases including methane ($CH_4$), carbon monoxide, and hydrogen which exist in superfluous quantities to reduce any metal oxide to the elemental metal which in turn moves through the conduit 17 to the metal holding furnace 9. Any other compounds combined with the metal oxides in the previous steps form a slag 33 which accumulates on the surface of a metal body 35. Both slag 33 and metal 35 are drained periodically from the furnace 9 into appropriate receptacles.

In the metal holding furnace 9 excess reducing gases comprising methane, carbon monoxide, and hydrogen from the conduit 17 pass through the upper portion of the furnace 9 and through the conduit 19 into the prereducer or fluidized bed 1.

The carbon-bearing reductant, such as methane or other hydrocarbon is introduced the arc heater 3 in a quantity in excess of that required to reduce the chromium oxide which excess quantity moves through the conduit 19 to the fluidized bed 1. The temperature of operation for the arc heater 3 ranges from about 1800° F to 4000° F, preferably at a temperature of 3150° F. As a result, the up-graded metallic ferro-chrome (with regard to the ratio of chromium to iron) issued from the arc heater is substantially free of the oxides of metals, such as calcium, magnesium, aluminum, and silicon, the latter of which form a slag which separates from the metallic ferro-chrome. In addition, excess methane, hydrogen, and carbon monoxide issue from the arc heater in a preheated state and are transmitted to the fluidized bed 1.

One exception to the foregoing procedure may include the omission of the separator 5, whether it be a magnetic separator for iron or another type of separator, such as flotation means, where a metal other than iron is a constituent of the original ore. Where it is desirable to produce ferrochromium as an alloying element, the iron may be carried over from the fluidized bed 1 to the arc heater 3 where it then combines with the chromium to form ferrochromium, the percentages of which iron and chromium are dictated by the parameters of operation of the separator.

The formula of the reaction occurring in the arc heater where some or all of the iron is transmitted through the arc heater 3 from the fluidized bed 1 is as follows:

where the iron-chrome ratio is that leaving the separator.

Where iron is completely eliminated by the separator 5, the formula of the reaction in the arc heater 3 is the same as the preceding formula with the omission of the iron element.

In summary, the Gangue materials comprising oxides of calcium magnesium, aluminum, and silicon, are carried through to the end of the process to provide the slag in which the ferro-alloy product collect before being tapped off into suitable receptacles.

In general, the process of this invention has the advantages of great saving in process cost, reduced air pollution over existing technology and an ability to select iron to chrome ratio in the product. Other advantages are readily apparent to those skilled in the art.

What is claimed is:

1. In a process for sequentially reducing metals from an ore containing a plurality of metal oxides, comprising the steps of
    a. heating the ore in a reducing gas atmosphere comprising a hydrocarbon at a temperature sufficient to reduce at least one oxide of a metal having a lower affinity for oxygen than at least another metal present,
    b. separating the metal from the metal oxides reduced in step (a),
    c. treating the ore in an arc heater in a reducing gas atmosphere comprising a hydrocarbon to reduce said other metal oxide to elemental form, the amount of reducing gas present being in excess of the required, and
    d. recirculating the excess amount of reducing gas to step (a) to preheat and prereduce said metal oxide of lower oxygen affinity.

2. The process of claim 1 in which the reduced metal is separated magnetically.

3. The process of claim 2 in which the reduced metal is iron.

4. The process of claim 1 in which the metal reduced and the concentrated ore are separated by a froth flotation step.

5. The process of claim 1 in which the metal reduced and the concentrated ore are separated by flotation.

6. In a process for reducing iron-bearing chromium oxide-containing ore to metallic chromium comprising the steps of
    a. heating the ore in a reducing gas atmosphere comprising a hydrocarbon at a temperature sufficient to reduce the iron oxide in the ore to iron of a lower valence without reducing the oxide of chromium,
    b. separating the iron form of lower valence from the reduced ore,
    c. treating the reduced ore in an arc heater in a reducing gas atmosphere comprising a hydrocarbon to reduce the chromium oxide to elemental chromium or alloys of higher chrome to iron ratios, the amount of reducing gas present being in excess of that required, and
    d. recirculating the excess amount of reducing gas to step (a) to preheat and prereduce the iron ore.

7. The process of claim 6 in which the reducing gas atmosphere produced by a mixture of a hydrocarbon and air.

8. The process of claim 6 in which the iron is separated magnetically.

* * * * *